(12) United States Patent
Barth

(10) Patent No.: US 9,046,416 B2
(45) Date of Patent: Jun. 2, 2015

(54) DEVICE FOR THE RADIOMETRIC CALIBRATION OF INFRA-RED MEASURING DEVICES

(75) Inventor: Jochen Barth, Oberschleissheim (DE)

(73) Assignee: EADS Deutschland GmbH, Ottobrunn (DE)

( * ) Notice: Subject to any disclaimer, the term of this patent is extended or adjusted under 35 U.S.C. 154(b) by 277 days.

(21) Appl. No.: 13/701,108

(22) PCT Filed: May 25, 2011

(86) PCT No.: PCT/DE2011/001109
§ 371 (c)(1),
(2), (4) Date: Nov. 30, 2012

(87) PCT Pub. No.: WO2012/006985
PCT Pub. Date: Jan. 19, 2012

(65) Prior Publication Data
US 2013/0068951 A1    Mar. 21, 2013

(30) Foreign Application Priority Data

Jun. 1, 2010  (DE) .......................... 10 2010 022 361

(51) Int. Cl.
*G01J 5/02* (2006.01)
*G01J 5/08* (2006.01)
*G01J 5/52* (2006.01)

(52) U.S. Cl.
CPC ... *G01J 5/08* (2013.01); *G01J 5/522* (2013.01)

(58) Field of Classification Search
CPC ....................................... G01J 5/522
USPC ............ 250/352, 353, 252.1, 339.02, 504 R, 250/338.1, 338.5, 226, 236, 330, 332, 493.1
See application file for complete search history.

(56) References Cited

U.S. PATENT DOCUMENTS

| 3,348,408 | A   |   | 10/1967 | Engborg |
|-----------|-----|---|---------|---------|
| 4,317,042 | A   | * | 2/1982  | Bartell .................... 250/493.1 |
| 6,232,614 | B1  | * | 5/2001  | Christy et al. ............ 250/504 R |
| 6,930,278 | B1  | * | 8/2005  | Chung et al. ............ 219/121.85 |
| 7,256,390 | B1  | * | 8/2007  | Cutlip .......................... 250/228 |

FOREIGN PATENT DOCUMENTS

DE    26 26 462  A1    12/1977
DE    195 31 536  C2    2/1997

OTHER PUBLICATIONS

International Search Report with English translation dated Dec. 7, 2011 (four (4) pages).

* cited by examiner

*Primary Examiner* — David Porta
*Assistant Examiner* — Meenakshi Sahu
(74) *Attorney, Agent, or Firm* — Crowell & Moring LLP

(57) ABSTRACT

A device for the radiometric calibration of infra-red measuring devices is provided. The device is in the form of a heated metal surface that is used as a radiant surface and is coated with a high-emission material. The device includes a spherical segment, the interior of which is coated with the high-emission material and the opening of the spherical segment is used as an aperture for an infra-red device that can be arranged in the center of the aperture.

6 Claims, 1 Drawing Sheet

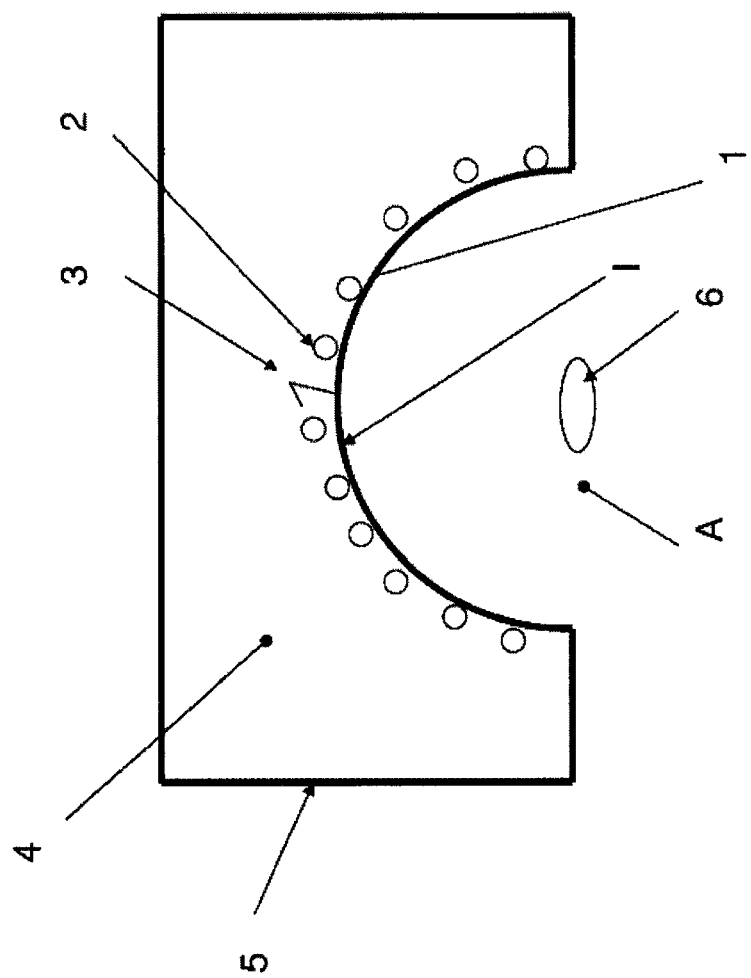

DEVICE FOR THE RADIOMETRIC CALIBRATION OF INFRA-RED MEASURING DEVICES

BACKGROUND AND SUMMARY OF THE INVENTION

Exemplary embodiments of the present invention relate to a device for radiometric calibration of infrared image sensors.

Infrared sensors with multi-element detectors must be calibrated before use in order to reduce interference structures—also referred to as fixed-pattern noise—on the sensors to a degree comparable to the temporal noise. To this end, the sensor is directed at a black body with a uniform temperature, the output signal from the detector elements is measured and correction coefficients are determined therefrom, the latter being used to equalize the signals to the same level. By virtue of carrying out this procedure for various black-body temperatures, it is possible to carry out higher order corrections for the temperature. As a result, an IR image is obtained which is free from artifacts over a broad temperature range.

Temperature-stabilized black bodies are commercially available. IR image sensors with a large field of view, e.g., with a fisheye optical unit, can only be calibrated in sections with the aid of such commercially available, planar black-body surfaces. This requires much time and leads to matching problems in the overlap regions.

German Patent Document DE 195 31 536 C2 discloses a device for radiometric calibration of IR measuring devices that uses a metal plate as a black-body surface. The metal plate is provided with a hood in the form of a dome, which is mirrored on the inside and has an opening, serving as aperture, at the vertex. An IR measuring device to be calibrated can be placed into this aperture. This arrangement creates a surface with a luminance that is as uniform as possible. In order to calibrate the whole of an IR image sensor with a large field of view with the aid of this device, the entrance pupil of the sensor must be brought into the aperture of the device. However, since the entrance pupil lies within the optical unit and not in front of the front lens in the case of a wide-angle optical unit, shadowing effects by the image sensor itself cannot be avoided, which can affect the luminance for large angles of view.

It is an object of the invention to develop a device by means of which it is possible to create a uniform luminance that is independent of the viewing angle in order also to calibrate IR image sensors with a large field of view in only one setting.

BRIEF DESCRIPTION OF THE DRAWING FIGURE

The invention will be explained in more detail below on the basis of the sole FIGURE, which illustrates an exemplary device for radiometric calibration of infrared measuring devices.

DETAILED DESCRIPTION

Referring to the sole FIGURE, a heatable metal surface serves as emitting surface I, which is coated by a high-emission material. The emitting surface I is furthermore embodied as inner surfaces (spherical cap) of a spherical segment 1. The inner side I of the spherical segment 1 is coated by the high-emission material. The great or small circle spherical segment serves as aperture A, into the center of which the infrared measuring device 6 to be calibrated, e.g., an infrared sensor, can be arranged.

A spherical cap, also a spherical calotte or spherical hood or spherical segment or spherical section is a flattened spherical section as flat dome. In a mathematical context, a distinction is made between spherical segment as body and spherical cap as surface. A sphere is uniquely determined by the radius, a cap by radius and aperture angle. If a plane and a sphere are made to intersect, the created intersection line is called a great circle if the plane contains the center of the sphere; otherwise it is called a small circle. The two portions created in the process are called spherical section or spherical segment. The hemisphere thus is a special case of the segment. The curved part of the surface of a spherical segment is called spherical calotte, spherical hood or spherical cap.

The inner side I of the spherical segment 1, i.e., the spherical cap, is used as black-body surface. The spherical cap 1 is expediently designed such that an emissivity close to 1, advantageously>0.9, is obtained. By way of example, this is achieved by virtue of the fact that the inner surface of the spherical segment 1 is roughened and coated by a matt black varnish layer, preferably by commercially available IR varnish.

Furthermore, the spherical segment 1 is advantageously made of copper. The entrance pupil of the sensor 6 to be calibrated in placed in the center of the spherical cap. This is how a perfect geometry is obtained for calibrating IR sensors with any image-field dimensions.

Means 2 for the temperature control of the spherical segment are expediently soldered onto the outside of the spherical segment. By way of example, the temperature control means 2 can be an electric heater and a Peltier element or a pipe which is in thermal contact with the spherical segment 1 and though which a temperature-controllable liquid is routed. For the purpose of regulating the temperature of the emitting inner surface of the spherical segment 1, a thermocouple 3 is provided on the outside of the spherical segment 1.

In order to improve the damping, the outside of the hemisphere 1 is shielded by a housing 4 comprising thermal damping material 5.

The spherically shaped spherical cap is viewed under the same aspect angle from the sensor for each viewing angle, and so the geometry of the calibration becomes independent of viewing angle and image field dimension. Even if the position of the entrance pupil varies over the image field, which, to a certain extent, is unavoidable for sensors with a fisheye optical unit, the variation in the emitted power obtained thus is restricted to a few percentage points. In comparison thereto, if a planar black-body surface is used, the emitted power at the edge of the image field relative to the image field center is reduced to a value of $\cos^2\alpha$, with a denoting half the image-field angle, i.e., to 75% at an angle of view of 60°, to 25% at 120° or, in the extreme case, to zero at an angle of view of 180°.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for radiometric calibration of an infrared measuring device, the device comprising:
    a spherical segment having an opening coincident with an opening of the device, wherein the spherical segment is coated by a high-emission material on an inner side, wherein the spherical segment is either a hemisphere or a portion of a hemisphere, wherein the device is in the form of a heated metal surface which serves as an emitting surface.

2. The device as claimed in claim 1, wherein a surface on the inner side of the spherical segment has a roughened surface that is coated with a material with an emissivity >0.9.

3. The device as claimed in claim 1, wherein the spherical segment is made of copper.

4. The device as claimed in claim 1, further comprising:
means for temperature control of the spherical segment, wherein the means for temperature control are soldered onto an outside of the spherical segment.

5. The device as claimed in claim 4, wherein the temperature control means is in thermal contact with the spherical segment and is an electric heater, a Peltier element, or a pipe though which a temperature-controllable liquid is routed.

6. The device as claimed in claim 4, further comprising:
a thermocouple that is in thermal contact with the spherical segment, wherein the thermocouple is configured to measure and regulate a temperature of the emitting surface.

* * * * *